June 25, 1963 T. A. ROBERTSON 3,095,024
TIRE TREAD CONSTRUCTION
Filed Aug. 31, 1961

United States Patent Office 3,095,024
Patented June 25, 1963

3,095,024
TIRE TREAD CONSTRUCTION
Thomas Allan Robertson, Akron, Ohio, assignor to The Firestone Tire & Rubber Company, Akron, Ohio, a corporation of Ohio
Filed Aug. 31, 1961, Ser. No. 135,347
15 Claims. (Cl. 152—209)

The present invention is directed to vehicle tire treads, and particularly to a novel tire tread construction comprising a structure which minimizes the pick-up and retention of stones and similar foreign bodies in the grooves between the anti-skid ribs.

The tread of present vehicle tires is generally comprised of a series of circumferentially extending anti-skid ribs, separated by a plurality of circumferentially extending grooves. No matter what circumferential path the grooves take, such grooves generally will, unless of a novel design, pick up and retain stones, gravel, and other similar foreign material over which the tire passes.

Numerous attempts have been made in the past to prevent stones or pebbles from being picked up and retained in the tread grooves between the anti-skid ribs. The grooves are generally radially outwardly opening, and usually have walls generally extending radially, or at right angles to the axis of rotation of the tire. The groove walls have in the past been provided with a variety of ribs, plugs, etc. to prevent stone pick up; none of these means have, however, been completely successful. Stones are normally first retained in the outer portion of the tread grooves, i.e. near the road surface of the tire tread. Here, they are objectionable in that they cause a great deal of noise as the tire rotates on the road, and they splay the groove walls apart, resulting in uneven tread wear.

The gravest danger, however, arises where the stones, during use of the tire, work themselves into the bottom of the tire grooves.

The base portion of tread grooves is particularly susceptible and sensitive to destruction. Stones or peebles lodged in the radially inner portion of the grooves not only reduce the useful life of the tire, but pose great dangers to tire construction.

The gouging of the rubber at the bottom of the tread grooves by stones and peebles promotes tread cracking, which results in early failure of the tire. Pebbles in this location work themselves through the rubbery layer at the base of the groove, and eventually through the cord body of the tire, causing puncture.

As stated above, the basic tire tread groove design has been changed in the past in an attempt to solve the stone retention problem. However, none of the means so far tried have been 100% effective: no matter what ejection systems have been employed, a certain number of stones would always tend to orient themselves between the various elements of the ejecting means. Once they were lodged between these ejecting members of prior art designs, it was not long before the pebbles were able to work themselves to the base of the grooves, with the attendant early failure of the tire from either tread cracking or puncture.

The present invention, on the other hand, has proven almost 100% successful in preventing the dangerous entry of stones to the lower portion or bottom of the tread grooves of the tire. The tire tread construction of this invention not only prevents stones from orienting themselves and thereafter working deeper into the tire grooves, but also accomplishes this result without sacrifice of wear and without placing limitations on the anti-skid features of the tread design.

It is, therefore, an object of the present invention to provide a tire tread construction in which the groove structure has a configuration resulting in improved resistance to stone-retention and stone pick-up.

Another object of the present invention is the provision of a tire tread groove structure which will prevent stones from working their way to the bottom of tread groove and causing early destruction of the tire.

Other objects and advantages of the present invention will become apparent from the following description of a preferred form of the invention, reference being had to the drawings in which.

This invention provides a construction wherein at least a pair of radially adjacent grooves present a labyrinth path to the bottom of the tread design. More specifically, a tread groove at one level provides abutments which overhang a lower groove at spaced intervals.

The present invention is illustrated generally and described herein in conjunction with a well-known zig-zag type of circumferentially continuous tire tread grooves. It will be apparent, from the description hereof, that the invention applies equally well to tire tread grooves of differing configurations, straight or curved, or indeed to intermittent designs.

Figure 1:
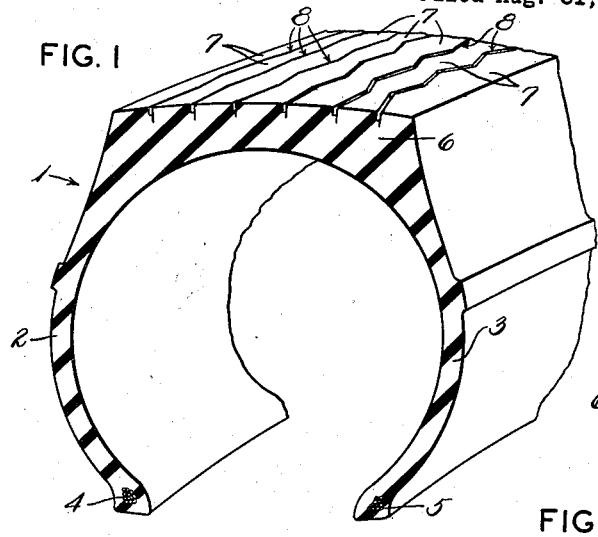
FIGURE 1 is a fragmentary, sectional perspective view of a tire incorporating the tread construction of the invention.

Referring now to FIGURE 1, the numeral 1 denotes a pneumatic tire having a generally circular cross section defined by sidewalls 2 and 3 terminating in beads 4 and 5, respectively, and by a tread portion 6.

For purposes of illustration, the tread 6 is shown comprised of a series of generally circumferentially extending anti-skid ribs 7, separated by generally circumferentially extending tire tread grooves 8.

Figure 2:
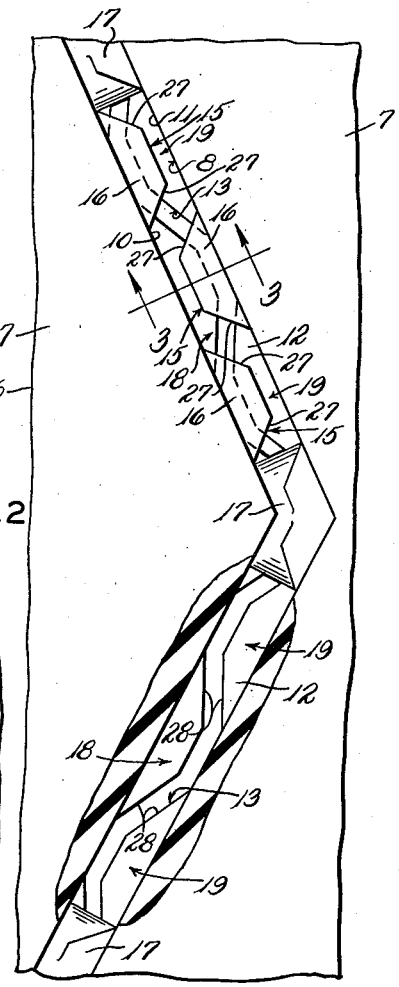
FIGURE 2 is an enlarged, fragmentary plan view of a portion of the tread of the tire of FIGURE 1, partially broken away and in section.

FIGURE 2 shows a portion of such a tread groove 8 in plan view.

Figures 3, 4:
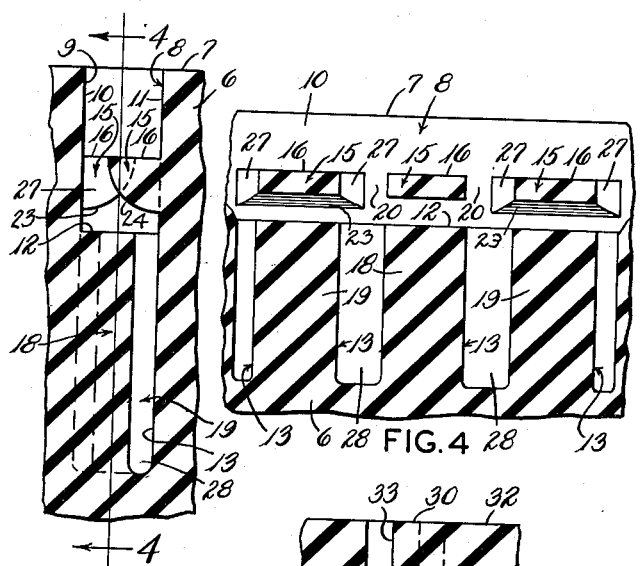
FIGURE 3 is an enlarged sectional view taken on line 3—3 of FIGURE 2.
FIGURE 4 is a sectional view taken on line 4—4 of FIGURE 3, shown on a somewhat reduced scale.

The radially outer portion 9 of the tread groove 8 is shown in FIGURE 3 to have generally radially outwardly extending, parallel sidewalls 10 and 11. These sidewall portions 10 and 11 may, however, be non-parallel, without departing from the scope of the invention. The bottom portion of this main tread groove 9 is indicated by the numeral 12, and is shown in FIGURE 3 to extend generally parallel to the surface of the road-contacting ribs 7, and between tie-bar elements 17. Periodically arranged tie-bars tend to maintain the stone-ejection configuration in the desired intermeshing relationship.

Extending further radially inwardly from the bottom portion 12 of the main groove is a second, narrower tread groove 13, shown in FIGURE 2 to proceed in a generally gear-tooth or square-wave path, the excursion of the path generally limited laterally by the sidewalls 10 and 11 of the main groove 9. The groove 13 thus forms a series of generally radially outwardly extending, intermeshed buttresses or pillars 18 and 19.

It will be seen that the invention thus provides, first, a primary straight groove 9 of substantial width, and a secondary groove 13 weaving from side to side and confined generally between the planes of the sidewalls of the main groove.

Radially outwardly of the base 12 of the main groove 9, but radially inwardly of the surface of the road-contacting ribs 7 of the tread, there is provided a series of abutments, generally indicated by the numeral 15. The abutments 15, as viewed in FIGURE 2, have the general appearance of small gear teeth and extend from the sidewalls 10 and 11 of the main groove 9. The abutments 15 are seen to intermesh, forming between them a third "groove" 20, limited by the walls 10 and 11 of the primary, upper groove 9, and reversed in phase to the configuration of the secondary, lower groove 13.

The top surface of each abutment 15 is denoted by the numeral 16, and is generally flat. Each abutment extends radially inwardly from its flat top face 16, curving back toward the main groove, with which it merges, as at 23 and 24.

It will thus be seen that there is provided, below the road-contacting tread surface of the tire, a groove 20, formed by intermeshing abutments 15 extending from opposite walls 10 and 11 of the main groove 9; below groove 20, and out of phase therewith, there is located a groove 13, created by the intermeshing, radial pillars 18 and 19; both of these groove systems are generally contained laterally between the planes of the sidewalls of main groove-portion 9.

The special advantages of the novel construction of the invention will be most apparent from reference to FIGURES 2 and 3. A stone which may appear in the main groove area 9 will initially be prevented from further entry deeper into the groove system by the intermeshed abutments 15, 15 whose broad faces 16 discourage further penetration. If a pebble should orient itself lengthwise of the portion 26 of groove 20, its further radial travel will be blocked by the top surface 12 of underlying pillar 18.

Should the pebble place itself in the portion 27 of groove 20, its radial inward progress will be stopped by the top surfaces 12 of underlying pillars 18 and 19; additionally, it will be seen that any stone aligning itself along groove-portion 27, will also lie at right angles to the portion 28 of the lower groove 13, thus further impeding progress of the stone.

It will be appreciated that the top row of abutments 15, 15 need not be shaped as shown in FIGURE 3, but may have any of a variety of forms, so long as a volume of material is present having sufficient column strength to remain effective in service. For example, the abutments, instead of being undercut, may present a portion of a cylinder or other solid.

Further, the pair of stone-excluding means may instead of opposed, similar, intermeshing abutments, usefully comprise spaced abutments along one wall of the groove, and facing a straight abutment extending from the opposite groove wall; in this case, the second, radially spaced means would comprise a similar arrangement of straight-and-toothed abutments, but reversed from the first means.

Figure 5:
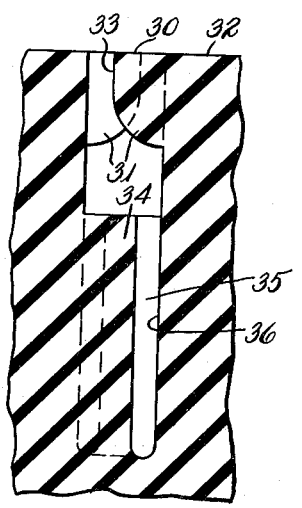
FIGURES 5 and 6 are views similar to FIGURE 3, showing modifications of the invention.

Appreciable resistance to stone-holding may be had by the modified construction shown in FIGURE 5, in which the top surfaces 30 of abutments 31, 31 are seen to be located at the level of the road-engaging tread surface 32, thus forming groove 33. Below this configuration is again located a second set of abutments 34, 35, which form the groove 36, out of phase with groove 33.

Figure 6:
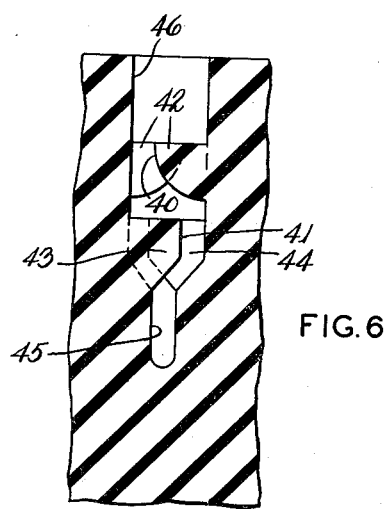

FIGURE 6 shows a modification, according to which tires have been successfully produced. In this construction, a further stone-excluding feature has been embodied. In addition to the out-of-phase grooves 40 and 41, formed by abutments 42, 42 and 43 and 44, respectively, there is provided yet another narrow groove 45. This groove is located radially inwardly of abutments 43 and 44, and is shown to extend substantially parallel to the main groove 46, but spaced laterally from the walls thereof. Utmost protection against tire failure is furnished by this construction.

Although a preferred form of the invention has been described, it will be apparent that modifications may be made therein by those skilled in the art without departing from the scope of the invention, as set forth in the appended claims.

What is claimed is:

1. A tire tread having adjacent ribs providing opposed walls therebetween, and comprising a pair of radially spaced, groove-forming means in said walls, each of said means comprising a plurality of intermeshing groove-forming teeth projecting laterally from said walls, respectively, and extending transversely of a portion of the groove in the other of said means, whereby said teeth in one of said means will block entry of a stone between said walls into the groove in said other means.

2. A tire tread having ribs providing opposed walls therebetween, and comprising radially spaced means in said walls, each of said means comprising a plurality of teeth projecting from one of said walls and transversely of portions of said teeth in the other of said means, whereby said teeth in one of said means will block a stone between said walls from entry between the teeth of the other of said means.

3. A tire tread having ribs providing opposed walls therebetween, and comprising radially spaced means in said walls, said means each comprising a plurality of intermeshed teeth projecting from said walls and forming a groove, the grooves in adjacent means groove being out of phase, whereby said teeth in one of said means will block entry of a stone between said walls into the groove of the other of said means.

4. A tire tread having ribs providing opposed walls therebetween, and comprising a pair of radially spaced means forming grooves between said walls, said means each comprising a plurality of circumferentially spaced, intermeshed teeth projecting from said walls, the teeth in one of said means extending oppositely to the radially adjacent teeth in the other of said means, said grooves being out of phase.

5. A tire tread having ribs with walls forming an outwardly opening first groove portion, first means in said walls comprising a plurality of teeth forming a tortuous second groove portion, and second means in said walls comprising a plurality of teeth forming a tortuous third groove portion radially spaced from, and out of phase with, said second groove portion.

6. A tire tread as in claim 5, and third means in said walls comprising a fourth groove portion extending radially inwardly of said second means.

7. A tire tread construction having opposing walls forming an outwardly opening groove, a first row of circumferentially spaced teeth projecting laterally from one of said walls into said groove relatively near the periphery of said tire tread, and a second row of circumferentially spaced teeth projecting laterally from the other of said walls into said groove, said second row of teeth located radially inwardly of said first row with the teeth of said rows radially aligned, whereby the teeth of one row will block entry of a stone within said groove to the bottom thereof.

8. A tire tread having ribs providing opposed walls therebetween, and comprising radially spaced means projecting from said walls, one of said means comprising a plurality of teeth at one radial level projecting from one of said walls and over a portion of another of said projecting means at a second radial level.

9. A tire tread construction as in claim 8, wherein said means are located radially inwardly of the outer periphery of said tire tread.

10. A tire tread having adjacent ribs providing opposed walls therebetween, and comprising a pair of radially spaced, groove-forming projecting means between said walls, one of said means comprising a plurality of circumferentially spaced teeth at one radial level projecting from one of said walls and over a portion of the other of said means at a second radial level.

11. A tire tread having adjacent ribs providing opposed walls therebetween, and comprising a pair of radially spaced, groove-forming projecting means between said walls, one of said means comprising a plurality of teeth at one radial level projecting from said walls, respectively, and over a portion of the other of said projecting means at a second radial level.

12. A tire tread construction as in claim 11, wherein said teeth in said one means intermesh.

13. A tire tread construction as in claim 11, wherein said teeth are undercut.

14. A tire tread construction as in claim 11, wherein said other means is undercut.

15. A tire tread construction having opposing walls forming an outwardly opening groove, first means in said groove comprising a plurality of teeth projecting from one of said walls and laterally of said groove, and second means in said groove spaced radially from said first means and projecting from one of said walls and laterally over said teeth, whereby said teeth will block entry of a stone within said groove to the bottom thereof.

References Cited in the file of this patent
UNITED STATES PATENTS

| | | |
|---|---|---|
| 2,637,632 | Briscoe et al. | May 5, 1953 |
| 2,661,041 | Walsh | Dec. 1, 1953 |
| 2,843,172 | Berry et al. | July 15, 1958 |